United States Patent
Xie et al.

(10) Patent No.: US 11,722,217 B2
(45) Date of Patent: *Aug. 8, 2023

(54) METHOD AND APPARATUS FOR OBTAINING ODN LOGICAL TOPOLOGY INFORMATION, DEVICE, AND STORAGE MEDIUM

(71) Applicant: HUAWEI TECHNOLOGIES CO., LTD., Guangdong (CN)

(72) Inventors: Yuming Xie, Nanjing (CN); Jian Li, Shenzhen (CN); Xin Xiao, Nanjing (CN); Gang Zheng, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/859,029

(22) Filed: Jul. 7, 2022

(65) Prior Publication Data

US 2022/0345218 A1    Oct. 27, 2022

Related U.S. Application Data

(63) Continuation of application No. 17/172,382, filed on Feb. 10, 2021, now Pat. No. 11,405,103, which is a (Continued)

(30) Foreign Application Priority Data

Aug. 15, 2018  (CN) .......................... 201810931334.9

(51) Int. Cl.
*H04B 10/079*   (2013.01)
*H04Q 11/00*    (2006.01)
*H04J 14/08*    (2006.01)

(52) U.S. Cl.
CPC ........ *H04B 10/0793* (2013.01); *H04J 14/086* (2013.01); *H04Q 11/0067* (2013.01);
(Continued)

(58) Field of Classification Search
CPC .................. H04B 10/0793; H04Q 11/0067
See application file for complete search history.

(56) References Cited

U.S. PATENT DOCUMENTS 11,405,103 B2 *  8/2022  Xie ..................... H04L 41/0677
2008/0292312 A1 * 11/2008  Oron .................. H04B 10/0795
                                                                398/33
(Continued)

FOREIGN PATENT DOCUMENTS

CN    102204127 A    9/2011
CN    103249056 A    8/2013
(Continued)

OTHER PUBLICATIONS

International Search Report and Written Opinion issued in PCT/CN2019/099926, dated Oct. 29, 2019, total 9 pages.
(Continued)

*Primary Examiner* — Nathan M Cors

(57) ABSTRACT

Embodiments of this application provide a method and an apparatus for obtaining optical distribution network (ODN) logical topology information, a device, and a storage medium. The method includes: obtaining identification information of each first ONU that is connected to a first passive optical network (PON) port and whose optical path changes and feature data of the first ONU in a first time window, where the feature data includes receive optical power and/or an alarm event; obtaining, based on the feature data of each first ONU, a feature vector corresponding to each first ONU; and performing cluster analysis on the feature vector corresponding to each first ONU, to obtain
(Continued)

topology information corresponding to the first PON port. ONU topology information is obtained by analyzing an ONU feature.

18 Claims, 5 Drawing Sheets

Related U.S. Application Data continuation of application No. PCT/CN2019/099926, filed on Aug. 9, 2019.

(52) U.S. Cl.
CPC ............... *H04Q 2011/0073* (2013.01); *H04Q 2011/0084* (2013.01)

(56) References Cited

U.S. PATENT DOCUMENTS

| | | | |
|---|---|---|---|
| 2011/0280568 A1 | 11/2011 | Dvir et al. | |
| 2015/0010306 A1* | 1/2015 | Prause | H04B 10/27 398/58 |
| 2015/0030328 A1* | 1/2015 | Fukuda | H04L 41/12 398/58 |
| 2021/0167852 A1 | 6/2021 | Xie et al. | |

FOREIGN PATENT DOCUMENTS

| | | | |
|---|---|---|---|
| CN | 103905111 A | 7/2014 | |
| CN | 103916188 A | 7/2014 | |
| CN | 104038375 A | 9/2014 | |
| CN | 104322016 A | 1/2015 | |
| CN | 106301830 A | 1/2017 | |
| CN | 107465966 A | 12/2017 | |
| EP | 2141832 A1 | 1/2010 | |
| EP | 2903182 * | 5/2015 | ........... H04B 10/079 |
| EP | 2903182 A1 | 8/2015 | |
| JP | 2011091464 A | 5/2011 | |
| WO | 2013035286 A1 | 3/2013 | |
| WO | 2013125002 A1 | 8/2013 | |
| WO | 2016039670 A2 | 3/2016 | |

OTHER PUBLICATIONS

Office Action issued in CN201810931334.9, dated Aug. 31, 2020, total 5 pages.
Extended European Search Report issued in EP19849232.4, dated Aug. 12, 2021, 9 pages.
Office Action issued in JP2021-507589, dated May 16, 2022, 7 pages.

* cited by examiner

METHOD AND APPARATUS FOR OBTAINING ODN LOGICAL TOPOLOGY INFORMATION, DEVICE, AND STORAGE MEDIUM

CROSS-REFERENCE TO RELATED APPLICATIONS

This application is a continuation of U.S. patent application Ser. No. 17/172,382, filed on Feb. 10, 2021, which is a continuation of International Application No. PCT/CN2019/099926, filed on Aug. 9, 2019, which claims priority to Chinese Patent Application No. 201810931334.9, filed on Aug. 15, 2018. All of the aforementioned applications are hereby incorporated by reference in their entireties.

TECHNICAL FIELD

This application relates to optical network technologies, and in particular, to a method and an apparatus for obtaining optical distribution network (ODN) logical topology information, a device, and a storage medium.

BACKGROUND

FIG. 1 is a schematic architectural diagram of a non-limiting example passive optical network system. As shown in FIG. 1, the passive optical network (PON) network system mainly includes an optical line terminal (OLT), an optical distribution network (ODN) including a passive optical device, and an optical network unit (ONU) at a user end; and usually uses a point-to-multipoint tree-type topology structure. As shown in FIG. 1, the following may be determined: (1) All ONUs are connected to a PON port of the OLT, that is, there is a specific topological relationship between the ONU and the PON port; and (2) In a specific implementation, the ONU may be connected to the PON port through a level-1 optical splitter and/or a level-2 optical splitter, and there is a specific topological relationship between the ONU and the level-2 optical splitter. The tree-type topology structure includes at least topology information of the ONU and the PON port and topology information of the ONU and the level-2 optical splitter.

According to existing fault handling technologies for home broadband, a fault needs to be located. Faults introduced by an OLT, an ONT, and an ODN account for a relatively high proportion. However, a faulty scenario of a PON network is complex, and a line is long. Therefore, the fault needs to be located based on PON network topology information. Currently, a commonly used approach to obtaining the topology information includes: (1) For topology information of all ONUs connected to a PON port of an OLT, the PON port that is of the OLT and to which the ONUs belong may be determined by using a point-to-point protocol over Ethernet (PPPoE) or the like, and therefore the corresponding topology information is obtained; or (2) Topology information of an ONU connected to a specific branch fiber/optical splitter is maintained through manual input.

However, in operation and maintenance process for PON network failures, a correspondence between an ONU and a branch fiber/optical splitter in a live network often changes, maintaining topology information of the branch fiber/optical splitter through manual input is relatively cumbersome, and the topology information is often inaccurate.

SUMMARY

This application provides a method and an apparatus for obtaining ODN logical topology information, a device, and a storage medium, to resolve an existing problem that in a operation and maintenance process for PON network failures, a correspondence between an ONU and a branch fiber/an optical splitter in a live network often changes, and/or maintaining topology information of the branch fiber/optical splitter through manual input are relatively cumbersome, and the topology information is often inaccurate.

According to a first aspect of an embodiment, this application provides a method for obtaining ODN logical topology information. The method includes:

obtaining identification information of each first ONU that is connected to a first PON port and whose optical path changes and feature data of the first ONU in a first time window, where the feature data includes at least one of receive optical power or an alarm event, and the alarm event includes an alarm generation time and an alarm type;

obtaining, based on the feature data of each first ONU, a feature vector corresponding to the first ONU, where the feature vector corresponding to the first ONU includes a feature of the first ONU that is used to indicate a change of the receive optical power in the first time window, and/or the alarm generation time and the alarm type of the first ONU; and performing cluster analysis on the feature vector corresponding to each first ONU, to obtain topology information corresponding to the first PON port, where the topology information includes identification information of at least one group of first ONUs, and identification information of each group of first ONUs is used to indicate that the first ONUs in the group are connected to a same non-level-1 optical splitter.

In this solution, ONU topology information is obtained by analyzing an ONU feature. This is simple and convenient. In addition, the obtained topology information is relatively accurate, and no manual input is required to maintain topology information of an optical splitter.

In a specific implementation in the foregoing solution, the obtaining identification information and feature data of each first ONU that is connected to a first PON port and whose optical path changes includes:

obtaining identification information and feature data of each ONU connected to the first PON port; and filtering out, based on the feature data, any ONU that is connected to the first PON port and whose optical path does not change, to obtain the identification information and the feature data of each first ONU that is connected to the first PON port and whose optical path changes.

In this solution, a manner in which an electronic device (for example, a server) that performs the technical solution obtains the identification information and the feature data of each ONU connected to the first PON port may be receiving the identification information and the feature data of each ONU connected to the first PON port and that are reported by a data collection device, or may be receiving the identification information and the feature data of each ONU connected to the first PON port and that are reported by an OLT, or may be actively obtaining the identification information and the feature data of each ONU from a data collection device or an OLT. This is not limited in embodiments of the present disclosure.

Optionally, the feature data of each first ONU further includes a distance measuring result.

In another specific implementation in the foregoing solution, the filtering out, based on the feature data, any ONU that is connected to the first PON port and whose optical path does not change, to obtain the identification information and the feature data of each first ONU that is connected to the first PON port and whose optical path changes includes:

comparing a difference between a maximum value and a minimum value of receive optical power of an ONU in the first time window with a preset threshold, and filtering out any ONU whose difference between a maximum value and a minimum value of its receive optical power is less than the threshold, to obtain the identification information and the feature data of each first ONU that is connected to the first PON port and whose optical path changes; and/or filtering out, based on the alarm generation time and the alarm type of each ONU in the first time window, any ONU whose alarm type does not include a preset alarm type, to obtain the identification information and the feature data of each first ONU that is connected to the first PON port and whose optical path changes.

In the implementation, filtering may be performed by independently comparing the difference between the maximum value and the minimum value of the receive optical power with the threshold, or filtering may be performed by independently using the preset alarm type, or the foregoing two solutions may be combined, that is, filtering is first performed based on the preset alarm type, and then filtering is performed by comparing the difference between the maximum value and the minimum value of the receive optical power with the threshold, or filtering is first performed by comparing the difference between the maximum value and the minimum value of the receive optical power with the threshold, and then filtering is performed based on the preset alarm type. This is not limited in embodiments of the present disclosure.

In a specific implementation in the foregoing solution, the obtaining, based on the feature data of each first ONU, a feature vector corresponding to each first ONU includes:

for each first ONU, extracting a required feature from the feature data of the first ONU, to form the feature vector corresponding to the first ONU.

In a specific implementation, a sample vector may be preset, and the sample vector includes a feature required for subsequent clustering. Then, the required feature is extracted from the feature data of the first ONU by using the sample vector, to form the feature vector corresponding to the first ONU, or the required feature may be directly extracted from the feature data of the first ONU, to form the feature vector corresponding to the first ONU. This is not limited in embodiments of the present disclosure.

Optionally, the feature of the first ONU that is used to indicate the change of the receive optical power in the first time window includes at least two of a jitter degree, a quantity of jitters, a cliff degree, a trend deterioration degree, a relative location of a time at which a minimum value appears for the first time, a relative location of a time at which a maximum value appears for the first time, a proportion of a length of a longest continuous subsequence in which receive optical power remains to be greater than an average value, and a proportion of a length of a longest continuous subsequence in which receive optical power remains to be less than an average value; the jitter degree is a standard deviation or an average deviation of data of the receive optical powers of the first ONU in the first time window; the quantity of jitters is an accumulated quantity of times that a jitter degree of the first ONU is greater than a preset threshold; the cliff degree is used to indicate an attenuation change of the receive optical power of the first ONU from a stable value to another stable value in a unit time; and the trend deterioration degree is indicated by a trend coefficient obtained through linear fitting after an exponential weighted moving average is computed on the receive optical powers in the first time window.

In another specific implementation, the performing cluster analysis on the feature vector corresponding to each first ONU, to obtain topology information corresponding to the first PON port includes:

obtaining, based on the feature vector corresponding to each first ONU, a similarity matrix between feature vectors corresponding to any two first ONUs; and using all the obtained similarity matrices as input of a clustering algorithm, to obtain the topology information corresponding to the first PON port.

In another specific implementation, if the first PON port includes a two-level optical splitting structure, the method further includes:

performing matrix conversion on a historical clustering result (topology information) obtained in each of at least two historical clustering processes corresponding to the first PON port, to obtain a distance matrix corresponding to the historical clustering result, where a value in the distance matrix represents a distance between any two first ONUs;

adding distance matrices corresponding to the historical clustering results obtained in the at least two historical clustering processes corresponding to the first PON port, to obtain a comprehensive distance matrix; and performing, based on the comprehensive distance matrix in a density-based clustering manner, cluster analysis on the first ONU that is connected to the first PON port and whose optical path changes, to obtain new topology information corresponding to the first PON port.

In this solution, accuracy of the obtained topology information can be further improved by comprehensively analyzing several historical clustering results.

Based on any one of the foregoing implementations, the method further includes:

generating a corresponding ODN logical topology diagram based on the topology information corresponding to the first PON port; and generating for display an interface presenting the ODN logical topology diagram.

According to a second aspect of an embodiment, this application provides an apparatus for obtaining ODN logical topology information. The apparatus includes:

an obtaining module, configured to obtain identification information of each first ONU that is connected to a first PON port and whose optical path changes and feature data of the first ONU in a first time window, where the feature data includes at least one of receive optical power and an alarm event, and the alarm event includes an alarm generation time and an alarm type; and a processing module, configured to obtain, based on the feature data of each first ONU, a feature vector corresponding to the first ONU, where the feature vector corresponding to the first ONU includes a feature of the first ONU that is used to indicate a change of the receive optical power in the first time window, and/or the alarm generation time and the alarm type of the first ONU, where the processing module is further configured to perform cluster analysis on the feature vector corresponding to each first ONU, to obtain topology information corresponding to the first PON port, where the topology information includes identification information of at least one group of first ONUs, and identification information of each group of first ONUs is used to indicate that the first ONUs in the group are connected to a same non-level-1 optical splitter.

Optionally, the obtaining module is further configured to:

obtain identification information and feature data of each ONU connected to the first PON port; and filter out, based on the feature data, any ONU that is connected to the first PON port and whose optical path does not change, to obtain the identification information and the feature data of each first ONU that is connected to the first PON port and whose optical path changes.

Optionally, the feature data of each first ONU further includes a distance measuring result.

Optionally, the obtaining module is further configured to:

compare a difference between a maximum value and a minimum value of receive optical power of an ONU in the first time window with a preset threshold, and filter out any ONU whose difference between a maximum value and a minimum value of its receive optical power is less than the threshold, to obtain the identification information and the feature data of each first ONU that is connected to the first PON port and whose optical path changes; and/or filter out, based on the alarm generation time and the alarm type of each ONU in the first time window, any ONU whose alarm type does not include a preset alarm type, to obtain the identification information and the feature data of each first ONU that is connected to the first PON port and whose optical path changes.

Optionally, the processing module is further configured to:

for each first ONU, extract a required feature from the feature data of the first ONU, to form the feature vector corresponding to the first ONU.

Optionally, the feature of the first ONU that is used to indicate the change of the receive optical power in the first time window includes at least two of a jitter degree, a quantity of jitters, a cliff degree, a trend deterioration degree, a relative location of a time at which a minimum value appears for the first time, a relative location of a time at which a maximum value appears for the first time, a proportion of a length of a longest continuous subsequence in which receive optical power remains to be greater than an average value, and a proportion of a length of a longest continuous subsequence in which receive optical power remains to be less than an average value; the jitter degree is a standard deviation or an average deviation of data of the receive optical powers of the first ONU in the first time window; the quantity of jitters is an accumulated quantity of times that a jitter degree of the first ONU is greater than a preset threshold; the cliff degree is used to indicate an attenuation change of the receive optical power of the first ONU from a stable value to another stable value in a unit time; and the trend deterioration degree is indicated by a trend coefficient obtained through linear fitting after an exponential weighted moving average is computed on the receive optical powers in the first time window.

Optionally, the processing module is further configured to:

obtain, based on the feature vector corresponding to each first ONU, a similarity matrix between feature vectors corresponding to any two first ONUs; and use all similarity matrices as input of a clustering algorithm, to obtain the topology information corresponding to the first PON port.

Optionally, if the first PON port includes a two-level optical splitting structure, the processing module is further configured to:

perform matrix conversion on a historical clustering result (topology information) obtained in each of at least two historical clustering processes corresponding to the first PON port, to obtain a distance matrix corresponding to the historical clustering result, where a value in the distance matrix represents a distance between any two first ONUs;

add distance matrices corresponding to the historical clustering results obtained in the at least two historical clustering processes corresponding to the first PON port, to obtain a comprehensive distance matrix; and perform, based on the obtained comprehensive distance matrix in a density-based clustering manner, cluster analysis on the first ONU that is connected to the first PON port and whose optical path changes, to obtain new topology information corresponding to the first PON port.

Optionally, the apparatus further includes a display module.

The processing module is further configured to generate a corresponding ODN logical topology diagram based on the topology information corresponding to the first PON port.

The display module is configured to display the ODN logical topology diagram.

According to a third aspect of an embodiment, this application provides an electronic device, including a memory, a processor, a receiver, a display, and a computer program. The computer program is stored in the memory, and the processor runs the computer program to perform the method for obtaining ODN logical topology information according to any one of the first aspect or the possible implementations of the first aspect.

According to a fourth aspect of an embodiment, this application provides a readable storage medium storing a computer program. The computer program, when executed by a computer, causes the computer to perform the method for obtaining ODN logical topology information according to any one of the first aspect or the possible implementations of the first aspect.

According to the method and the apparatus for obtaining ODN logical topology information, the device, and the storage medium that are provided in this application, the identification information and the feature data of each first ONU that is connected to the first PON port and whose optical path changes are obtained; the feature vector corresponding to each first ONU is obtained based on the feature data of each first ONU; and cluster analysis is performed on the feature vector corresponding to each first ONU, to obtain the topology information corresponding to the first PON port, where the topology information includes identification information of at least one ONU connected to a non-level-1 optical splitter. To be specific, ONU topology information is directly obtained by analyzing an ONU feature. This is simple and convenient. In addition, the obtained topology information is relatively accurate, and no manual input is required to maintain topology information of an optical splitter, to reduce manual maintenance pressure.

BRIEF DESCRIPTION OF DRAWINGS

FIG. 9 is a schematic structural diagram of non-limiting, example Embodiment 2 of an apparatus for obtaining ODN logical topology information according to.

DESCRIPTION OF EMBODIMENTS

Figure 1:
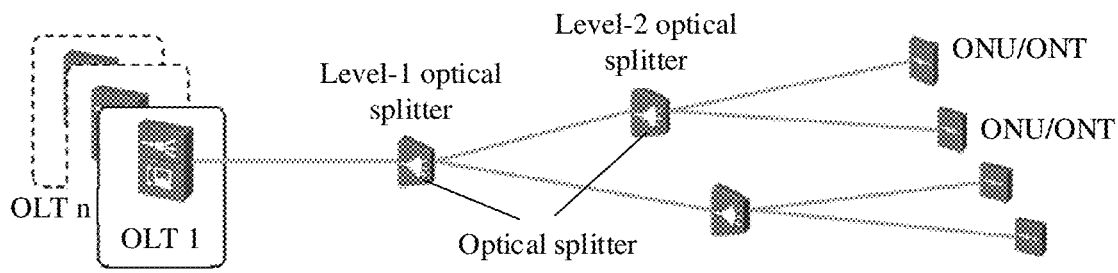
FIG. 1 is a schematic architectural diagram of a passive optical network system according to an embodiment.

In an existing ODN topology discovery solution, for topology information of all optical network units (ONU) connected to a passive optical network (PON) port of an optical line terminal (OLT), the PON port that is of the OLT and to which the ONUs belong may be determined by using PPPoE. The topology information is accurate. Topology information of some ONUs connected to a specific branch fiber/optical splitter is maintained through manual input. In operation and maintenance process for PON network failures, a correspondence between the ONU and the branch fiber/optical splitter in a live network often changes, maintaining topology information of the branch fiber/optical splitter through manual input is relatively cumbersome, and the topology information is often inaccurate.

To resolve the foregoing existing problem, an embodiment of this application provides a method for obtaining ODN logical topology information, and the method may be applied to an electronic device. The electronic device may be a network server, or may be a specially disposed server configured to obtain network topology information, or may be a terminal device such as a computer that can perform data analysis processing, or may be a software module in a server or a device. This is not limited in embodiments of the present disclosure. Whether an ODN logical topology discovery system is implemented in the server, the terminal device, or the like, or implemented in an electronic device by using a software module, the ODN logical topology discovery system mainly includes modules such as: (1) a feature data collection and storage module; (2) an ONU feature mining module; and/or (3) a cluster analysis module, to obtain required topology information. Optionally, the ODN logical topology discovery system may further include a topology update function module.

In example technical solutions disclosed in this application, massive device data indicators are collected, and a big data technology is used to obtain a key parameter feature of a data indicator during device running A consistency feature of ONU group behavior is fully used, so that an algorithm model for automatic learning and incremental discovery of an ODN logical topology is established and applied online, to incrementally discover branch topology information.

The following describes, by using several specific embodiments, non-limiting, example method for obtaining ODN logical topology information. An example PON network system to which the technical solution is applied includes a plurality of OLTs. Each OLT is provided with a PON port, and all ONUs are connected to the PON port. The ONUs may be connected in an optical splitting manner by using a level-1 optical splitter. The ONUs may alternatively be connected in an optical splitting manner by using a plurality of level-2 optical splitters connected to the level-1 optical splitter. Alternatively, the ONUs may be connected in an optical splitting manner by using level-3 optical splitters connected to the level-2 optical splitters. Other cases may be obtained by analogy. In the PON network system, a quantity of optical splitting levels is not limited, and optical splitters at different levels may be configured based on an actual application requirement to connect the ONUs.

In a specific implementation of the method for obtaining ODN logical topology information, data collected in the ONU includes receive optical power, transmit optical power, a bias current, a distance measuring result, and the like of the ONU. An alarm generation time, an alarm type, and the like of each ONU connected to the OLT are obtained from the OLT device. In an implementation, the receive optical power of the ONU may be selected as a key performance indicator (KPI) for analysis.

In addition to the foregoing description, in an embodiment, it should be further understood that the ONU includes all optical network units, for example, includes an optical network terminal (ONT), a multi-tenant unit (MTU), a multi-dwelling unit (MDU), and the like.

Figure 2:
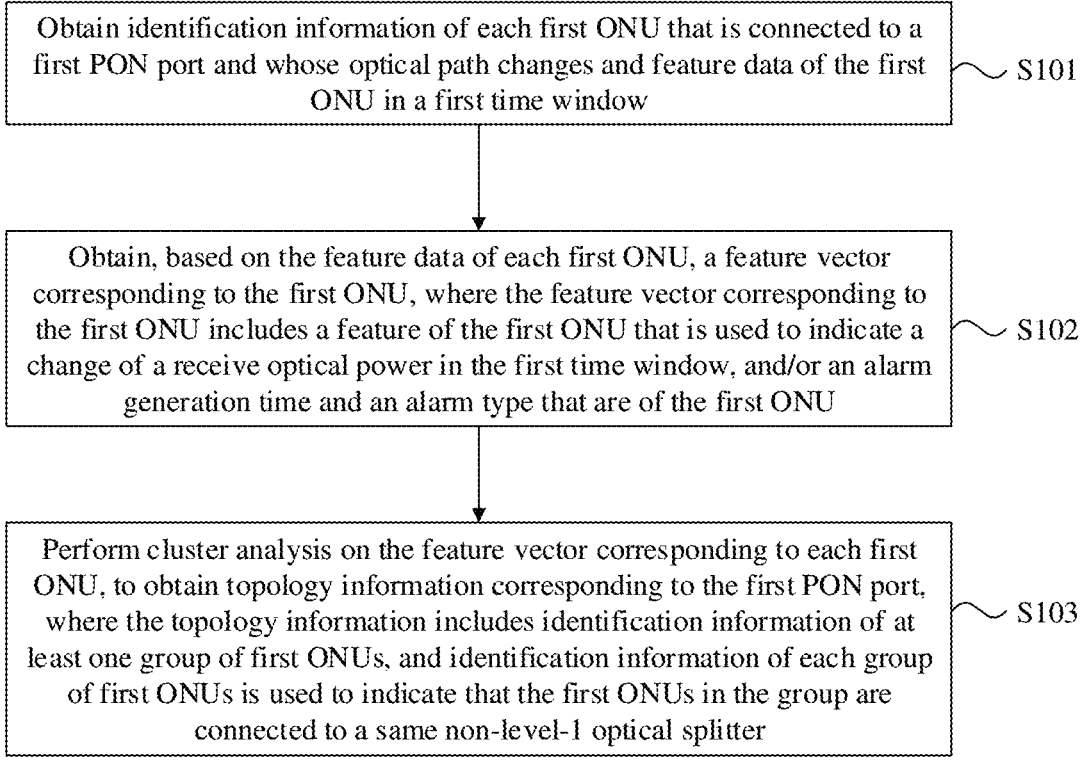
FIG. 2 is a flowchart of non-limiting, example Embodiment 1 of a method for obtaining ODN logical topology information.

FIG. 2 is a flowchart of a non-limiting, example Embodiment 1 of a method for obtaining ODN logical topology information. As shown in FIG. 2, the method for obtaining ODN logical topology information specifically includes the following steps:

S101: Obtain identification information of each first ONU, which is connected to a first PON port and whose optical path changes, and feature data of the first ONU in a first time window.

This step is usually implemented by a data collection module and a storage module in an electronic device.

In an operation and maintenance process of a PON network system, the electronic device performing the solution needs to continuously obtain feature data of each ONU on each PON port. To identify a specific ONU, identification information of different ONUs also needs to be simultaneously obtained. The solution is described by using an example in which data collection and processing analysis are performed on a PON port (namely, the first PON port).

Feature data of the ONU in the first time window includes at least one of receive optical power and an alarm event, and the alarm event includes an alarm generation time and an alarm type. The first time window herein may be set based on an actual situation, and is not limited herein.

Usually, a manner of obtaining identification information and feature data of all first ONUs, which are connected to a PON port and whose optical paths change, is obtaining the identification information and the feature data of each ONU connected to the first PON port, and then filtering out, based on the feature data, any ONU that is connected to the first PON port and whose optical path does not change, to obtain the identification information and the feature data of each first ONU that is connected to the first PON port and whose optical path changes. In a specific implementation, at least the following two manners are included.

In a first implementation, the identification information and the feature data of each ONU connected to the first PON port and that are sent by a data collection device are received; and the ONU that is connected to the first PON port and whose optical path does not change is filtered out based on the feature data, to obtain the identification information and the feature data of each first ONU that is connected to the first PON port and whose optical path changes.

A data collection platform, also referred to as the data collection device, may be specially disposed, to collect data. In a running process, the ONU periodically reports the feature data of the ONU to the data collection device. A reporting period may be configured based on an actual situation, for example, the reporting period is 5 minutes. The data collection device receives the feature data reported by the ONU on the first PON port, and correspondingly stores the feature data based on the identification information of the ONU. The feature data herein may include data of the receive optical power of the ONU, the alarm event, a distance measuring result, and the like, to facilitate topology learning in a subsequent analysis process.

In an embodiment, after obtaining the identification information and the feature data of all the ONUs, the data collection device reports the data to an execution body, e.g., the electronic device. In a process of processing the data, the electronic device filters ONUs on the first PON port based on the feature data to filter out any ONU whose optical path does not change, and leaves only identification information and feature data of all first ONUs whose optical paths change.

Optionally, in a specific implementation in the solution, the data collection device may alternatively screen ONUs on the first PON port based on the feature data to filter out any ONU whose optical path does not change, leave only the identification information and the feature data of the first ONU whose optical path changes, and then reports, to the electronic device, the identification information and the feature data of the ONU whose optical path changes. This is not limited in embodiments of the present disclosure.

In a second implementation, the identification information and the feature data, which are of each ONU connected to the first PON port and are sent by a first OLT, are received; and the ONU that is connected to the first PON port and whose optical path does not change is filtered out based on the feature data, to obtain the identification information and the feature data of each first ONU that is connected to the first PON port and whose optical path changes.

In this solution, there is no need to specially dispose a data collection device. The ONU may periodically report the feature data to the OLT, and then the OLT periodically reports the obtained identification information and corresponding feature data of the ONU to the electronic device for processing and analysis. A reporting period may be configured based on an actual situation, for example, the reporting period is 15 minutes.

Similarly, in an embodiment, after obtaining the identification information and the corresponding feature data of the ONU, the OLT may filter out any ONU whose optical path does not change, then obtain the identification information and the feature data of the first ONU whose optical path changes, and reports, to the electronic device that performs data analysis and topology learning, the identification information and the feature data of each first ONU whose optical path changes.

Alternatively, after obtaining the identification information and the corresponding feature data of the ONU, the OLT may directly report the identification information and the feature data of the first ONU whose optical path changes. After receiving the identification information and the corresponding feature data of the ONU on the first PON port, the electronic device filters out any ONU whose optical path does not change, and then obtains the identification information and feature data of each first ONU whose optical path changes.

In a specific implementation in the foregoing solution, the feature data of each first ONU may further include a distance measuring result.

In the foregoing two implementation solutions, the received identification information and feature data of the ONUs need to be filtered, to filter out any ONU whose optical path does not change. Specifically, filtering may be performed in the following manners:

(1) A difference between a maximum value and a minimum value of receive optical power of an ONU in the first time window is compared with a preset threshold, and an ONU whose difference between a maximum value and a minimum value of its receive optical power is less than the threshold is filtered out, to obtain the identification information and the feature data of each first ONU that is connected to the first PON port and whose optical path changes.

In this solution, it means that filtering is performed by using a difference between a maximum value and a minimum value of receive optical power of a same ONU in the first time window is greater than or equal to an expert experience threshold. For example, the threshold may be preconfigured as follows:

$$RxPower_{min} - RxPower_{min} \geq RxPower_{th}.$$

Herein, $RxPower_{max}$ is the maximum value of the receive optical power of the ONU in the first time window, $RxPower_{min}$ is the minimum value of the receive optical power of the ONU in the first time window, and $RxPower_{th}$ is a specified threshold, for example, may be set to 1 dB by default.

According to the foregoing formula, the ONU whose difference between the maximum value and the minimum value of the receive optical power is less than the threshold is filtered out, to obtain the identification information and the feature data of each first ONU that is connected to the first PON port and whose optical path changes.

(2) An ONU whose alarm type is not a preset alarm type is filtered out based on an alarm generation time and an alarm type of each ONU in the first time window, to obtain the identification information and the feature data of each first ONU that is connected to the first PON port and whose optical path changes.

In this solution, it means that a required alarm type is preset, the ONU that is not of the specified preset alarm type is filtered out based on the alarm generation time and the alarm type of each ONU in the first time window, and then the identification information and the feature data of each first ONU that is connected to the first PON port and whose optical path changes remain. For example, the required preset alarm type such as a loss of signal (LOS) or a loss of frame (LOF) may be preset. In a specific implementation, the preset alarm type is usually an alarm indicating that an optical path is interrupted. In an embodiment, it may be understood that the LOF indicates that if the OLT cannot locate an upstream frame of an ONU for four consecutive frames, the OLT generates an LOF alarm, and may disconnect the ONU. The LOS indicates that if the OLT cannot receive, for four consecutive frames, an upstream optical signal sent by an ONU, the OLT generates an LOS alarm, and may disconnect the ONU.

(3) The foregoing two manners are combined. To be specific, after the difference between the maximum value and the minimum value of the receive optical power in the feature data is compared with the specified threshold, the ONU whose difference between the maximum value and the minimum value of the receive optical power is less than the threshold is filtered out, and then remaining ONUs are filtered by using the preset alarm type, to finally obtain the identification information and the feature data of each first ONU that is connected to the first PON port and whose optical path changes.

S102: Obtain, based on the feature data of each first ONU, a feature vector corresponding to the first ONU, where the feature vector corresponding to the first ONU includes a feature of the first ONU that is used to indicate a change of the receive optical power in the first time window, and/or the alarm generation time and the alarm type of the first ONU.

In this step, after obtaining the identification information and the feature data of each first ONU that is connected to the first PON port and whose optical path changes, the electronic device needs to obtain the feature vector of each ONU. The feature vector includes the feature of the first ONU that is used to indicate the change of the receive optical power in the first time window, and/or the alarm generation time and the alarm type of the first ONU. In a specific implementation, for each first ONU, a required feature may be extracted from the feature data of the first ONU based on a predefined sample vector, to form the feature vector corresponding to the first ONU.

The feature of the first ONU that is used to indicate the change of the receive optical power in the first time window includes at least two of a jitter degree, a quantity of jitters, a cliff degree, a trend deterioration degree, a relative location of a time at which a minimum value appears for the first time, a relative location of a time at which a maximum value appears for the first time, a proportion of a length of a longest continuous subsequence in which receive optical power remains to be greater than an average value, and a proportion of a length of a longest continuous subsequence in which receive optical power remains to be less than an average value, wherein the jitter degree is a standard deviation or an average deviation of data of receive optical power of the ONU in the first time window, the quantity of jitters is an accumulated quantity of times when a jitter degree of the ONU is greater than a preset threshold, the cliff degree is used to indicate an attenuation change of the receive optical power of the ONU from a stable value to another stable value in a unit time, and the trend deterioration degree is indicated by a trend coefficient obtained through linear fitting after an exponential weighted moving average is computed on receive optical power in the first time window.

In addition, if the feature vector corresponding to the first ONU includes the alarm event, the feature vector specifically includes the alarm generation time and the alarm type.

In this embodiment, it means that a sample feature vector is first defined, and is also referred to as a sample vector. The sample vector includes the feature (also referred to as a feature of a time sequence of the receive optical power of the ONU) that is of the first ONU and that is used to indicate the change of the receive optical power in the first time window, including the at least two of the jitter degree, the quantity of jitters, the cliff degree, the trend deterioration degree, the time at which the minimum value appears for the first time, the time at which the maximum value appears for the first time, the length of the longest continuous subsequence in which receive optical power remains to be greater than the average value, and the length of the longest continuous subsequence in which receive optical power remains to be less than the average value; the alarm event of the ONU, including the alarm generation time and the alarm type; and an optical distance between the ONU and the OLT, including a measured distance (also referred to as a distance measuring result). The feature of the time sequence of the optical power is to analyze a sequence within a time window, and a time length needs to be configured, for example, may be configured as one day.

A sample vector is specifically shown as follows:

$$X = \{x_1, x_2, x_3, x_4, x_5, x_6, x_7, x_8, x_9, x_{10}, x_{11}\} =$$

$$\begin{cases} x_1 & \text{represents the jitter degree.} \\ x_2 & \text{represents the quantity of jitters.} \\ x_3 & \text{represents the cliff degree.} \\ x_4 & \text{represents the trend deterioration degree.} \\ x_5 & \text{represents the relative location of the time at which the minimum value appears for the first time.} \\ x_6 & \text{represents the relative location of the time at which the maximum value appears for the first time.} \\ x_7 & \text{represents the proportion of the length of the longest continuous subsequence greater than the average value.} \\ x_8 & \text{represents the proportion of the length of the longest continuous subsequence less than the average value.} \\ x_9 & \text{represents the alarm generation time.} \\ x_{10} & \text{represents the alarm type.} \\ x_{11} & \text{represents a measured distance.} \end{cases}$$

Figure 3:
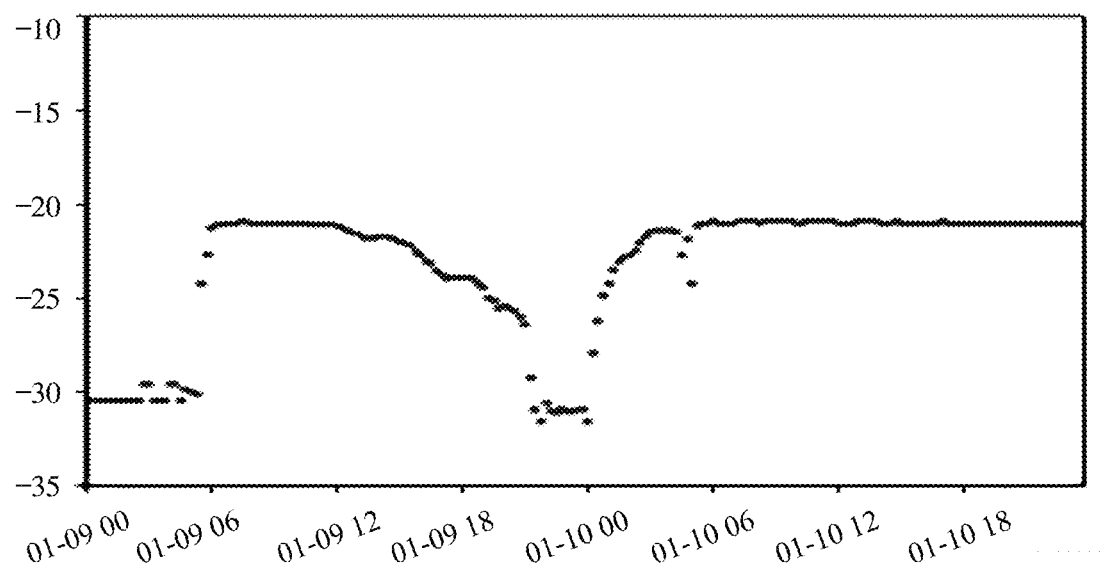
FIG. 3 is a schematic diagram of a jitter degree of receive optical power of an ONU according to an embodiment.

After obtaining the feature data of all the first ONUs, the electronic device analyzes configured KPI data and a configured time window by using a big data technology, and extracts a parameter from the feature data, to obtain the feature vector of each first ONU. Each parameter in the feature vector is specifically described below. Details are as follows:

(a) Jitter degree: FIG. 3 is a schematic diagram of a jitter degree of receive optical power of an ONU according to an embodiment. As shown in FIG. 3, it can be learned that the receive optical power of the ONU usually changes slightly. When an optical path between the OLT and the ONU changes, receive optical power of a plurality of ONTs/ONUs connected to a same PON port of the OLT device change. A standard deviation of data of the receive optical power of the ONUs in a time window may be separately calculated to represent the jitter degree.

(b) Quantity of jitters: An accumulated quantity of times that the jitter degree is greater than a threshold may be used to represent the quantity of jitters.

(c) Cliff degree: The cliff degree indicates an attenuation change of the receive optical power of the ONU from a stable value to another stable value in a unit time. The attenuation change is greater than a threshold, for example, an attenuation threshold is 3 dB. If an attenuation degree, namely, a loss, is less than the threshold, the attenuation degree is directly set to 0. If an attenuation degree is greater than the threshold, a normalized value is used. A normalized processing mode is $(\text{loss}-\text{loss}_{min})/(\text{loss}_{max}-\text{loss}_{min})$, where $\text{loss}_{max}$ and $\text{loss}_{min}$ are respectively a maximum value and a minimum value of a cliff of the ONU. The unit time herein may be one collection period, or may be a plurality of collection periods, and the unit time may be set based on an actual situation.

Figure 4:
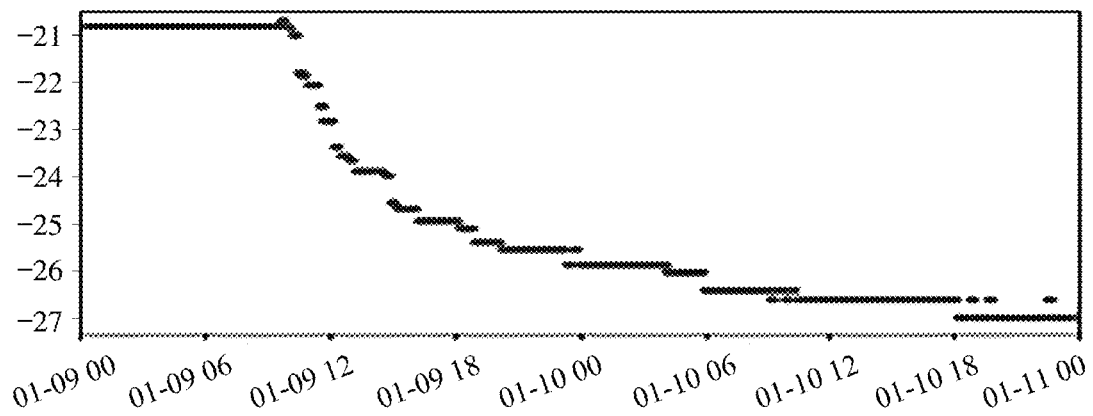
FIG. 4 is a schematic diagram of a trend deterioration degree of an ONU according to an embodiment.

(d) Trend deterioration degree: FIG. 4 is a schematic diagram of a trend deterioration degree of an ONU according to an embodiment. FIG. 4 shows the deterioration degree of the ONU. The electronic device computes an exponential weighted moving average (EWMA) on the KPI in the first time window, then performs linear fitting, and uses a trend coefficient as the deterioration degree.

(e) Relative location of the time at which the minimum value appears for the first time: The relative location is a relative location of the time at which the minimum value of the receive optical power of the ONU in the first time window appears for the first time relative to the entire time sequence. For example, a sequence of receive optical power starts from a moment t0, there is a maximum value during a sudden decrease at a moment t1, and a time at which the sequence ends is tn. In this case, the relative location of the time at which the minimum value appears for the first time is equal to (t1−t0)/(tn−t0).

(f) Relative location of the time at which the maximum value appears for the first time: The relative location is a relative location of the time at which the maximum value of the receive optical power of the ONU in the first time window appears for the first time relative to the entire time sequence. For example, a sequence of receive optical power starts from a moment t0, there is a maximum value during a sudden increase at a moment t1, and a time at which the sequence ends is tn. In this case, the relative location of the time at which the maximum value appears for the first time is equal to (t1−t0)/(tn−t0).

(g) Proportion of the length of the longest continuous subsequence in which receive optical power remains to be greater than the average value: An average value of receive optical power of an ONU in a time window is calculated, then statistics on lengths of continuous subsequences in which receive optical power remains to be greater than the average value are collected, and a longest subsequence is selected. For example, a time span of a longest continuous subsequence in which receive optical power remains to be greater than an average value in receive optical power time sequence is L1, and a time span of the entire sequence is L0. In this case, the feature value may be obtained by using L1/L0.

(h) Proportion of the length of the longest continuous subsequence in which receive optical power remains to be less than the average value: An average value of receive optical power of an ONU in a time window is calculated, then statistics on lengths of continuous subsequences in which receive optical power remains to be less than the average value are collected, and a longest subsequence is selected. For example, a time span of a longest continuous subsequence in which receive optical power remains to be less than an average value in receive optical power time sequence is L2, and a time span of the entire sequence is L0. In this case, the feature value may be obtained by using L2/L0.

(i) Alarm generation time: The alarm generation time is also referred to as a relative time at which an alarm is generated or a time at which the ONU generates an alarm. For example, when a level-2 backbone optical fiber is faulty, a plurality of ONUs connected to a same PON port of the OLT device generate alarms in a relatively short time. Assuming that the alarm generation time is $t_{a1}$, a time at which a time sequence starts is $t_0$, and a time at which the time sequence ends is $t_n$, $(t_{a1}-t_0)/(t_n-t_0)$ is used to represent the feature value.

(j) Alarm type: The alarm type is a type of an alarm generated by the ONU. For example, when a level-2 backbone optical fiber is faulty, a plurality of ONUs connected to a same PON port of the OLT device generate key alarms in an approximate time window. For example, if an ONU generates an LOS alarm or an LOF alarm, the feature value is 1; or if an ONU does not generate an LOS alarm or an LOF alarm, the feature value is 0.

(k) Measured distance of the ONU: The measured distance is a distance between the ONU and the PON port of the OLT device, and may be collected on the ONU device. The measured distance changes slightly with a time. A measured distance of a given ONU may be considered as an average value in a sequence. Assuming that an optical measured distance of the ONU is Len1, and a maximum measured distance in measured distances of all ONUs on the PON port is maxLen, Len1/maxLen is used as the feature value of the measured distance of the ONU.

After the feature vector of each first ONU is obtained in the foregoing manner, cluster analysis is performed on the feature vector of each ONU, that is, a subsequent process is performed.

S103: Perform cluster analysis on the feature vector corresponding to each first ONU, to obtain topology information corresponding to the first PON port, where the topology information includes identification information of at least one group of first ONUs, and identification information of each group of first ONUs is used to indicate that the first ONUs in the group are connected to a same non-level-1 optical splitter.

Figure 5:
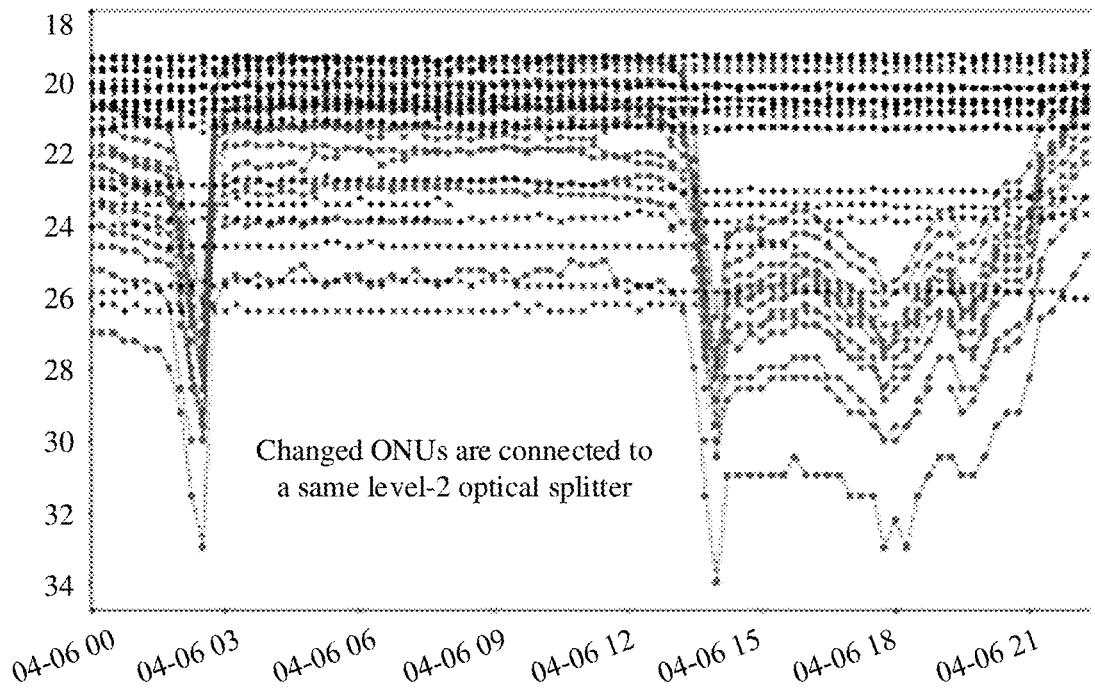
FIG. 5 is a schematic diagram of a KPI of an ONU according to an embodiment.

A plurality of ONUs are connected to the non-level-1 optical splitter such as a level-2 optical splitter or a level-3 optical splitter. When non-level-1 light or the non-level-1 optical splitter is abnormal, behaviors of KPI of ONUs on the same PON port of the OLT device are similar. For example, FIG. 5 is a schematic diagram of a KPI of an ONU according to an embodiment. As shown in FIG. 5, feature data of ONUs connected to a same level-2 optical splitter is similar to some extent, that is, KPIs are similar to some extent. Therefore, after the feature vector corresponding to each first ONU is obtained, cluster analysis may be performed based on the feature vector, to determine which first ONUs are connected to the same non-level-1 optical splitter.

The following describes the clustering process by using an example in which the non-level-1 optical splitter is a level-2 optical splitter. Usually, the clustering process may be implemented by using a clustering algorithm, and in particular, ONUs may be clustered by using a similarity-based clustering algorithm. For example, in the clustering analysis process, an affinity propagation (AP) clustering algorithm may be used. Detailed implementation steps are as follows:

(a) Feature vectors $X_i=\{x_1,x_2,x_3,x_4,x_5,x_6,x_7,x_8,x_9,x_{10},x_{11}\}$ of all first ONUs whose optical paths change and that are connected to the same PON port of the OLT device are extracted in step S102, where a feature vector of each first ONU is used as a node.

(b) A similarity between a node i and a node j is represented as S(i, j). The formula is shown as follows, that is, is a negative value of a Euclidean distance between the feature vectors. A larger value of S(i, j) indicates that the node i is closer to the node j. During AP clustering, the node j is used as a capability of a clustering center of the node i. A similarity matrix mat-S may be obtained by calculating a similarity between every two first ONUs of all the first ONUs. If there are p ONUs, a dimension of the generated similarity matrix mat-S is p*p.

$$S(i, j) = -\sqrt{\sum_{k=1}^{N}(x_{ik} - x_{jk})^2}.$$

Herein, N represents a quantity of features of the feature vector.

(c) The similarity matrix mat-S is used as input of AP clustering, so that a clustering result can be obtained. For example, the clustering result is as follows: It is assumed that a1, a2, a3, a5, and a6 are numbers of different ONUs on the first PON port. If a1, a2, and a3 are more similar to each other, and a5 and a6 are more similar to each other, the clustering result is expressed in a form of {'cluster-1': [a1, a2, a3], 'cluster-2': [a5, a6]}, in other words, similar ONUs are clustered in a cluster. For example, the non-level-1 optical splitter is the level-2 optical splitter. A meaning of a topology corresponding to the clustering result {'cluster-1': [a1, a2, a3], 'cluster-2': [a5, a6]} is: a1, a2, and a3 are connected to a same level-2 optical splitter, and a5 and a6 are connected to a same level-2 optical splitter.

To be specific, cluster analysis may also be performed, in the foregoing manner, on ONUs connected to an optical splitter at another level, to finally obtain the topology information corresponding to the first PON port. The topology information includes identification information of a plurality of groups of ONUs. It means that ONUs corresponding to identification information of the ONUs in each group are connected to the same non-level-1 optical splitter.

Optionally, after performing the foregoing step, the electronic device may further generate a corresponding ODN logical topology diagram based on the obtained topology information of the PON port, and directly display the ODN logical topology diagram to a user, so that the user can directly determine a topology status of the ONU.

According to the method for obtaining ODN logical topology information provided in this embodiment, the electronic device such as the server or the terminal device obtains the identification information and the feature data of each first ONU that is connected to the first PON port and whose optical path changes; obtains, based on the feature data of each first ONU, the feature vector corresponding to each first ONU; and performs cluster analysis on the feature vector corresponding to each first ONU, to obtain the topology information corresponding to the first PON port, where the topology information includes identification information of at least one ONU connected to the non-level-1 optical splitter. To be specific, ONU topology information is directly obtained by analyzing an ONU feature. This is simple and convenient. In addition, the obtained topology information is relatively accurate, and no manual input is required to maintain topology information of an optical splitter, to reduce manual maintenance pressure.

In some cases, the ODN changes because some ONUs are disconnected or operation and maintenance personnel replaces the ONUs through plug-in and plug-out. Therefore, in an embodiment, the topology may be further updated by using a topology update module. Historical topology discovery data in a specific period of time is stored, and comprehensive determining is performed by using a current newly discovered topology and several historical topologies, to obtain actual ODN topology information that more conforms to an actual situation. Details are described below by using some example embodiments.

Figure 6:
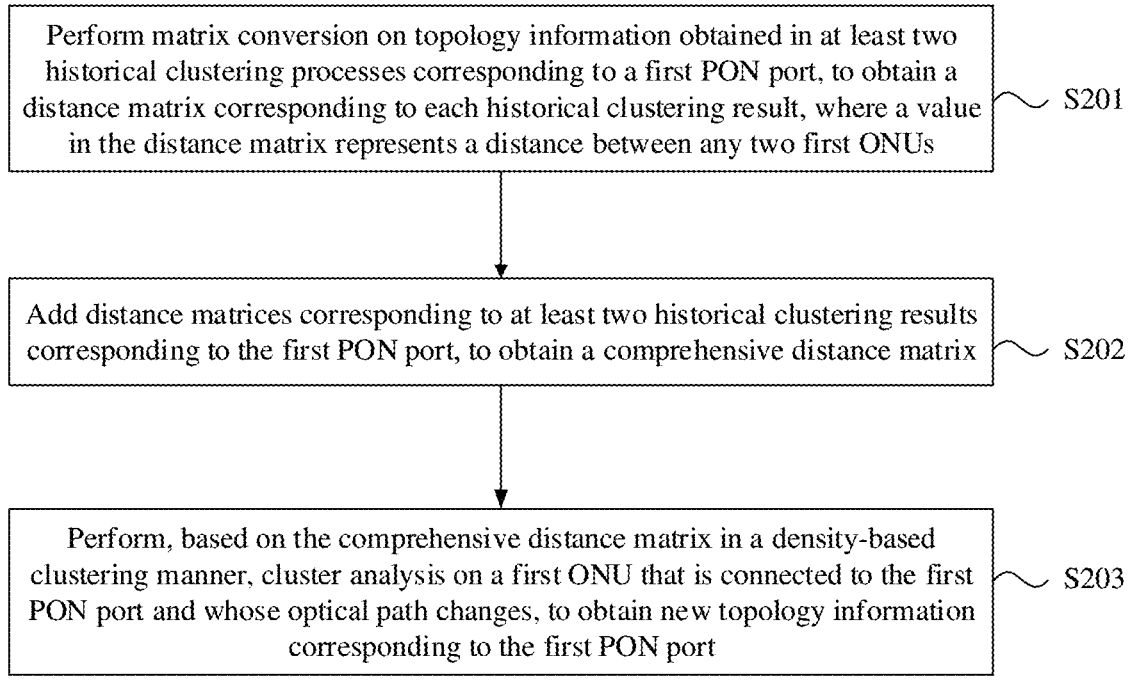
FIG. 6 is a flowchart of non-limiting, example Embodiment 2 of a method for obtaining ODN logical topology information.

FIG. 6 is a flowchart of a non-limiting, example Embodiment 2 of a method for obtaining ODN logical topology information. As shown in FIG. 6, based on the foregoing embodiments, if the first PON port includes a two-level optical splitting structure, the method for obtaining ODN logical topology information further includes the following steps.

S201: Perform matrix conversion on topology information (historical clustering results) obtained in at least two historical clustering processes corresponding to the first PON port, to obtain a distance matrix corresponding to each historical clustering result, where a value in the distance matrix represents a distance between any two first ONUs.

In this step, a quantity of historical topologies N-topology stored in the electronic device may be set through configuration. If N-topology is set to 3, data of two historical topologies is stored, and comprehensive analysis is performed by using a current topology and the two historical topologies.

In an example topology update solution, a single clustering result of a logical topology, namely, single topology information, is first converted into a distance matrix between every two ONUs. It is assumed that a clustering result is {'cluster 1': [a1, a2, a3, a4], 'cluster 2': [a5, a6, a7, a8]}, where a1, ..., and a8 are numbers of different ONUs on the first PON port, that is, a1, a2, a3, and a4 may be connected to a same level-2 optical splitter, and a5, a6, a7, and a8 may be connected to a same level-2 optical splitter, and is also represented as {'level-2 optical splitter 1': [a1, a2, a3, a4], 'level-2 optical splitter 2': [a5, a6, a7, a8]}. The clustering result is converted into a distance matrix. Details are as follows:

$$\begin{array}{c} & a1 \ a2 \ a3 \ a4 \ a5 \ a6 \ a7 \ a8 \\ \begin{array}{c} a1 \\ a2 \\ a3 \\ a4 \\ a5 \\ a6 \\ a7 \\ a8 \end{array} & \left( \begin{array}{cccccccc} 0 & 0 & 0 & 0 & 1 & 1 & 1 & 1 \\ 0 & 0 & 0 & 0 & 1 & 1 & 1 & 1 \\ 0 & 0 & 0 & 0 & 1 & 1 & 1 & 1 \\ 0 & 0 & 0 & 0 & 1 & 1 & 1 & 1 \\ 1 & 1 & 1 & 1 & 0 & 0 & 0 & 0 \\ 1 & 1 & 1 & 1 & 0 & 0 & 0 & 0 \\ 1 & 1 & 1 & 1 & 0 & 0 & 0 & 0 \\ 1 & 1 & 1 & 1 & 0 & 0 & 0 & 0 \end{array} \right) \end{array}$$

In the matrix, 0 indicates similarity, and 1 indicates dissimilarity.

Assuming that a clustering result (namely, topology information) of the first historical topology is {'level-2 optical splitter 1': [a1, a3, a4], 'level-2 optical splitter 2': [a5, a6, a7, a8]}, the clustering result may also be converted into a distance matrix. Details are as follows:

$$\begin{array}{c} & a1 \ a2 \ a3 \ a4 \ a5 \ a6 \ a7 \ a8 \\ \begin{array}{c} a1 \\ a2 \\ a3 \\ a4 \\ a5 \\ a6 \\ a7 \\ a8 \end{array} & \left( \begin{array}{cccccccc} 0 & 1 & 0 & 0 & 1 & 1 & 1 & 1 \\ 1 & 0 & 0 & 0 & 1 & 1 & 1 & 1 \\ 0 & 0 & 0 & 0 & 1 & 1 & 1 & 1 \\ 0 & 0 & 0 & 0 & 1 & 1 & 1 & 1 \\ 1 & 1 & 1 & 1 & 0 & 0 & 0 & 0 \\ 1 & 1 & 1 & 1 & 0 & 0 & 0 & 0 \\ 1 & 1 & 1 & 1 & 0 & 0 & 0 & 0 \\ 1 & 1 & 1 & 1 & 0 & 0 & 0 & 0 \end{array} \right) \end{array}$$

In the matrix, 0 indicates similarity, and 1 indicates dissimilarity.

Assuming that a clustering result (namely, topology information) of the second historical topology is {'level-2 optical splitter 1': [a1, a2, a4], 'level-2 optical splitter 2': [a5, a6, a7, a8]}, the clustering result may also be converted into a distance matrix. Details are as follows:

a1 a2 a3 a4 a5 a6 a7 a8

-continued $$\begin{pmatrix} a1 \\ a2 \\ a3 \\ a4 \\ a5 \\ a6 \\ a7 \\ a8 \end{pmatrix} \begin{pmatrix} 0 & 0 & 1 & 0 & 1 & 1 & 1 & 1 \\ 0 & 0 & 0 & 0 & 1 & 1 & 1 & 1 \\ 1 & 0 & 0 & 0 & 1 & 1 & 1 & 1 \\ 0 & 0 & 0 & 0 & 1 & 1 & 1 & 1 \\ 1 & 1 & 1 & 1 & 0 & 0 & 0 & 0 \\ 1 & 1 & 1 & 1 & 0 & 0 & 0 & 0 \\ 1 & 1 & 1 & 1 & 0 & 0 & 0 & 0 \\ 1 & 1 & 1 & 1 & 0 & 0 & 0 & 0 \end{pmatrix}$$

In the matrix, 0 indicates similarity, and 1 indicates dissimilarity.

S202: Add distance matrices corresponding to at least two historical clustering results corresponding to the first PON port, to obtain a comprehensive distance matrix.

In this step, a plurality of historical clustering results corresponding to the first PON port, namely, the distance matrices corresponding to the topology information obtained by using the solution in Embodiment 1, may be summed up in a manner of the foregoing step, to obtain a comprehensive distance matrix. Specifically, in the foregoing instance, a comprehensive distance matrix may be obtained by adding the foregoing three distance matrices:

$$\begin{array}{c} \phantom{a1} a1\ a2\ a3\ a4\ a5\ a6\ a7\ a8 \\ \begin{pmatrix} a1 \\ a2 \\ a3 \\ a4 \\ a5 \\ a6 \\ a7 \\ a8 \end{pmatrix} \begin{pmatrix} 0 & 1 & 1 & 0 & 3 & 3 & 3 & 3 \\ 1 & 0 & 0 & 0 & 3 & 3 & 3 & 3 \\ 1 & 0 & 0 & 0 & 3 & 3 & 3 & 3 \\ 0 & 0 & 0 & 0 & 3 & 3 & 3 & 3 \\ 3 & 3 & 3 & 3 & 0 & 0 & 0 & 0 \\ 3 & 3 & 3 & 3 & 0 & 0 & 0 & 0 \\ 3 & 3 & 3 & 3 & 0 & 0 & 0 & 0 \\ 3 & 3 & 3 & 3 & 0 & 0 & 0 & 0 \end{pmatrix} \end{array}$$

Optionally, in an embodiment, the foregoing comprehensive distance matrix may be further corrected, to improve accuracy of the clustering result. In a specific implementation method, each element in the matrix is corrected. In a correction manner, if a value of the element is less than a specified threshold th1, the value of the element is set to 0; or if a value of the element is not less than a specified threshold th1, the value of the element is set to n.

The threshold th1 is a minimum integer greater than or equal to n×0.6. Herein, if n=3, the threshold is 2. To be specific, a value less than 2 in the foregoing matrix is set to 0, and another value is set to 3. In this way, the following corrected matrix may be obtained:

$$\begin{array}{c} \phantom{a1} a1\ a2\ a3\ a4\ a5\ a6\ a7\ a8 \\ \begin{pmatrix} a1 \\ a2 \\ a3 \\ a4 \\ a5 \\ a6 \\ a7 \\ a8 \end{pmatrix} \begin{pmatrix} 0 & 0 & 0 & 0 & 3 & 3 & 3 & 3 \\ 0 & 0 & 0 & 0 & 3 & 3 & 3 & 3 \\ 0 & 0 & 0 & 0 & 3 & 3 & 3 & 3 \\ 0 & 0 & 0 & 0 & 3 & 3 & 3 & 3 \\ 3 & 3 & 3 & 3 & 0 & 0 & 0 & 0 \\ 3 & 3 & 3 & 3 & 0 & 0 & 0 & 0 \\ 3 & 3 & 3 & 3 & 0 & 0 & 0 & 0 \\ 3 & 3 & 3 & 3 & 0 & 0 & 0 & 0 \end{pmatrix} \end{array}$$

S203: Perform, based on the comprehensive distance matrix in a density-based clustering manner, cluster analysis on the first ONU that is connected to the first PON port and whose optical path changes, to obtain new topology information corresponding to the first PON port.

In this step, after the comprehensive distance matrix is obtained, the density-based clustering method may be used to perform cluster analysis again on the first ONU that is connected to the PON port and whose optical path changes, to obtain a new clustering result, namely, the new topology information.

Based on the comprehensive matrix obtained in the foregoing instance, the density-based clustering method, for example, density-based spatial clustering of applications with noise (DBSCAN), is used for the matrix. If a neighborhood distance is set to th1 (e.g., the threshold obtained in the previous step), and a minimum quantity of neighboring objects minPts is set to 3 (may be set to a minimum quantity of ONUs in level-2 optical splitting based on an actual situation), it can be learned that a combination of the three clustering results is {'level-2 optical splitter 1': [a1, a2, a3, a4], 'level-2 optical splitter 2': [a5, a6, a7, a8]}.

The clustering result indicates that a1, a2, a3, and a4 are connected to the level-2 optical splitter 1, and a5, a6, a7, and a8 are connected to the level-2 optical splitter 2.

In this solution, clustering principles and steps of DBSCAN are as follows:

(a) Input: a sample set D, a neighborhood radius eps, and a minimum quantity of neighborhood sample points minPts.

(b) Concepts:

Neighborhood: For any object in D, if a Euclidean distance between another sample point and the object is less than eps, it is considered that the other sample point is located in a neighborhood of eps of the object.

Core object: If a quantity of sample points in a neighborhood of eps of a given object is greater than or equal to minPts, the object is referred to as the core object.

Direct density reachability: For two sample points p and q in D, if p is in a neighborhood of eps of q, and q is a core object, it is considered that the object p is directly density-reachable from q.

Density reachability: For the sample set D, if there is an object chain $p_1, p_2, \ldots,$ and $p_n$, $p_1=p$, $p_n=p$, and for $p_i \in D(1 \leq i \leq n)$, $p_{i+1}$ is directly density-reachable from $p_i$ about eps and minPts, the object p is density-reachable from the object q about the neighborhood of eps and minPts.

Density connectivity: If there is an object q so that both p and q are density-reachable from o about eps and minPts, the objects p and q are density-connected about eps and minPts.

(c) Clustering steps:

Step 1. Determine whether an input point is a core object.

Step 2: If the input point is determined to be a core object, find all directly density-reachable points in a neighborhood of eps of the determined core object.

Step 3: Repeat step 1 and step 2 for each of the input points until the determination of all the input points is completed.

Step 4: Find a maximum density connectivity object set for all directly density-reachable points in neighborhoods of eps of all core objects, and combine density-reachable objects to form a cluster.

Step 5: Repeat step 4 until the neighborhoods of eps of all the core objects are traversed. In this case, a plurality of formed clusters are final clustering results.

Based on the foregoing embodiments, in an embodiment, the method for obtaining ODN logical topology information provided in this application further includes the following steps: generating a corresponding ODN logical topology diagram based on the topology information corresponding to the first PON port; and displaying the ODN logical topology diagram.

Figure 7:
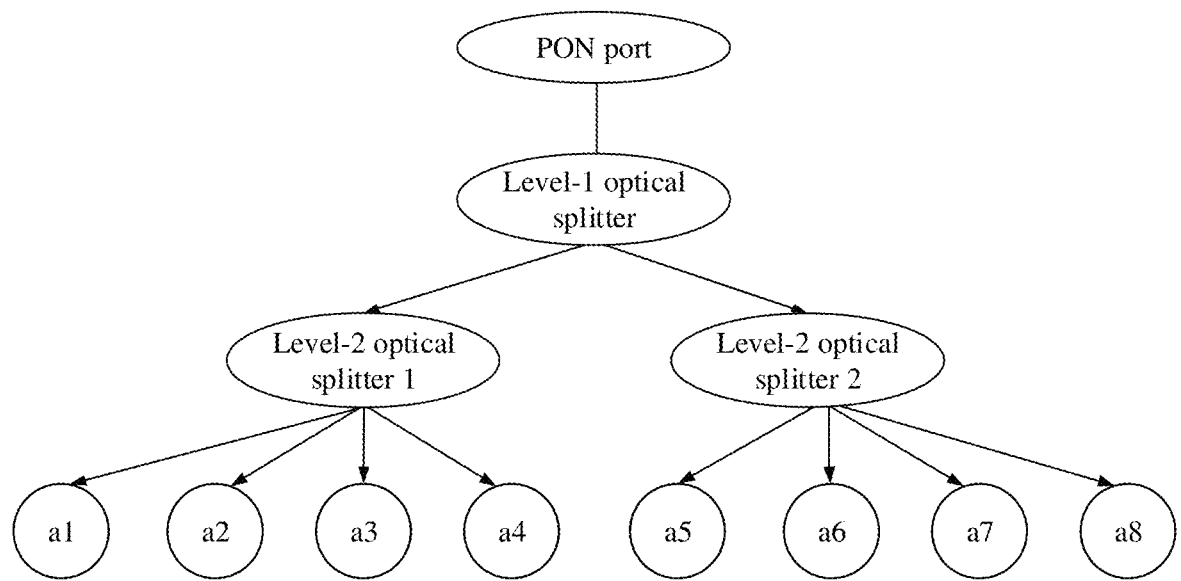
FIG. 7 is a schematic diagram of an ODN logical topology diagram according to an embodiment.

FIG. 7 is a schematic diagram of an ODN logical topology diagram according to an embodiment. As shown in FIG. 7, the ODN logical topology diagram generated based on the topology information obtained through clustering shows that the PON port is connected to a level-1 optical splitter, the level-1 optical splitter is connected to a level-2 optical splitter 1 and a level-2 optical splitter 2, four ONUs a1, a2, a3, and a4 on the PON port are connected to the same level-2 optical splitter 1, and four ONUs a5, a6, a7, and a8 on the PON port are connected to the same level-2 optical splitter 2.

According to the method for obtaining ODN logical topology information provided in this embodiment, a problem that fault locating is difficult, a locating time is long, and maintenance costs are high because a branch topology (for example, a level-2 topology) is unknown and resource management system data of the branch topology (for example, the level-2 topology) is inaccurate is resolved. In addition, cost overheads caused by manually maintaining resource management information can be reduced, and inaccurate resource management information caused by a frequent change of a correspondence between the ONT and the level-2 optical splitter can be avoided. Moreover, the topology information is used to improve a remote automatic locating rate, reduce dependency on a professional maintenance tool, reduce a quantity of invalid on-sites of device maintenance personnel, improve processing efficiency, and reduce maintenance costs.

Figure 8:
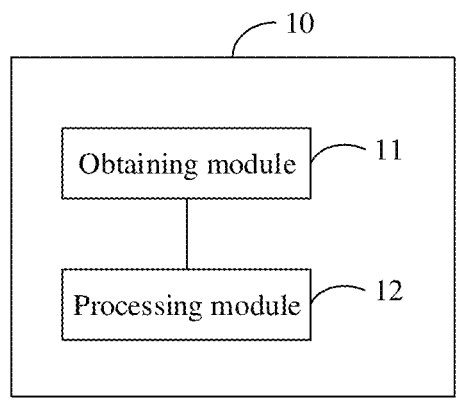
FIG. 8 is a schematic structural diagram of non-limiting, example Embodiment 1 of an apparatus.

FIG. 8 is a schematic structural diagram of non-limiting, example Embodiment 1 of an apparatus. As shown in FIG. 8, the apparatus 10 for obtaining ODN logical topology information includes:

an obtaining module 11, configured to obtain identification information of each first ONU that is connected to a first PON port and whose optical path changes and feature data of the first ONU in a first time window, where the feature data includes at least one of receive optical power and an alarm event, and the alarm event includes an alarm generation time and an alarm type; and a processing module 12, configured to obtain, based on the feature data of each first ONU, a feature vector corresponding to the first ONU, where the feature vector corresponding to the first ONU includes a feature of the first ONU that is used to indicate a change of the receive optical power in the first time window, and/or the alarm generation time and the alarm type of the first ONU, where the processing module 12 is further configured to perform cluster analysis on the feature vector corresponding to each first ONU, to obtain topology information corresponding to the first PON port, where the topology information includes identification information of at least one group of first ONUs, and identification information of each group of first ONUs is used to indicate that the first ONUs in the group are connected to a same non-level-1 optical splitter.

The apparatus for obtaining ODN logical topology information provided in this embodiment is configured to perform the technical solution provided in any one of the foregoing method embodiments. An implementation principle and a technical effect of the apparatus are similar to those of the technical solution provided above. ONU topology information is obtained by analyzing an ONU feature. This is simple and convenient. In addition, the obtained topology information is relatively accurate, and no manual input is required to maintain topology information of an optical splitter.

Based on the foregoing embodiment, in a specific implementation, the obtaining module 11 is further configured to:

obtain identification information and feature data of each ONU connected to the first PON port; and filter out, based on the feature data, any ONU that is connected to the first PON port and whose optical path does not change, to obtain the identification information and the feature data of each first ONU that is connected to the first PON port and whose optical path changes.

Optionally, the feature data of each first ONU further includes a distance measuring result.

Optionally, the obtaining module 11 is further configured to:

compare a difference between a maximum value and a minimum value of receive optical power of an ONU in the first time window with a preset threshold, and filter out an ONU whose difference between a maximum value and a minimum value of its receive optical power is less than the threshold, to obtain the identification information and the feature data of each first ONU that is connected to the first PON port and whose optical path changes; and/or filter out, based on the alarm generation time and the alarm type of each ONU in the first time window, any ONU whose alarm type does not include a preset alarm type, to obtain the identification information and the feature data of each first ONU that is connected to the first PON port and whose optical path changes.

Optionally, the processing module 12 is further configured to:

for each first ONU, extract a required feature from the feature data of the first ONU, to form the feature vector corresponding to the first ONU.

Optionally, the feature of the first ONU that is used to indicate the change of the receive optical power in the first time window includes at least two of a jitter degree, a quantity of jitters, a cliff degree, a trend deterioration degree, a relative location of a time at which a minimum value appears for the first time, a relative location of a time at which a maximum value appears for the first time, a proportion of a length of a longest continuous subsequence in which receive optical power remains to be greater than an average value, and a proportion of a length of a longest continuous subsequence in which receive optical power remains to be less than an average value; the jitter degree is a standard deviation or an average deviation of data of receive optical power of the ONU in the first time window; the quantity of jitters is an accumulated quantity of times that a jitter degree of the ONU is greater than a preset threshold; the cliff degree is used to indicate an attenuation change of the receive optical power of the ONU from a stable value to another stable value in a unit time; and the trend deterioration degree is indicated by a trend coefficient obtained through linear fitting after an exponential weighted moving average is computed on the receive optical power in the first time window.

Optionally, the processing module 12 is further configured to:

obtain, based on the feature vector corresponding to each first ONU, a similarity matrix between feature vectors corresponding to any two first ONUs; and use all similarity matrices as input of a clustering algorithm, to obtain the topology information corresponding to the first PON port, where the topology information corresponding to the first PON port includes identification information of a plurality of groups of first ONUs, and identification information of each group of first ONUs is used to determine that the first ONUs in the group are connected to a same level-2 optical splitter.

Optionally, if the first PON port includes a two-level optical splitting structure, the processing module 12 is further configured to:

perform matrix conversion on a historical clustering result (topology information) obtained in each of at least two historical clustering processes corresponding to the first PON port, to obtain a distance matrix corresponding to the historical clustering result, where a value in the distance matrix represents a distance between any two first ONUs;

add distance matrices corresponding to the historical clustering results obtained in the at least two historical clustering processes corresponding to the first PON port, to obtain a comprehensive distance matrix; and perform, based on the comprehensive distance matrix in a density-based clustering manner, cluster analysis on the first ONU that is connected to the first PON port and whose optical path changes, to obtain new topology information corresponding to the first PON port.

The apparatus for obtaining ODN logical topology information provided in any one of the foregoing embodiments is configured to perform the technical solution provided in any one of the foregoing method embodiments. An implementation principle and a technical effect of the apparatus are similar to those of the technical solution. Details are not described herein again.

Figure 9:
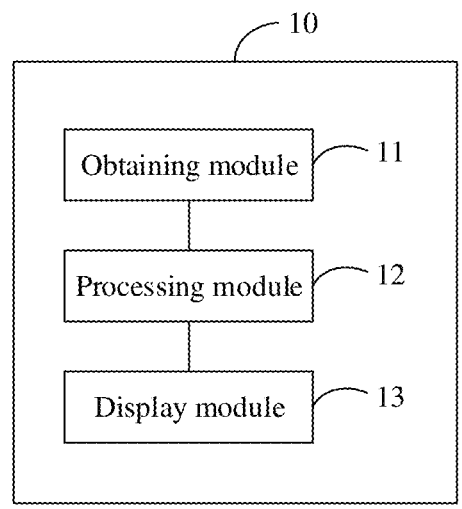

FIG. 9 is a schematic structural diagram of non-limiting, example Embodiment 2 of an apparatus for obtaining ODN logical topology information. As shown in FIG. 9, based on any one of the foregoing embodiments, the apparatus 10 for obtaining ODN logical topology information further includes a display module 13.

The processing module 12 is further configured to generate a corresponding ODN logical topology diagram based on the topology information corresponding to the first PON port.

The display module 13 is configured to display the ODN logical topology diagram.

An implementation principle and a technical effect of the apparatus for obtaining ODN logical topology information provided in this embodiment are similar to those of the technical solution provided above. Details are not described herein again.

Figure 10:
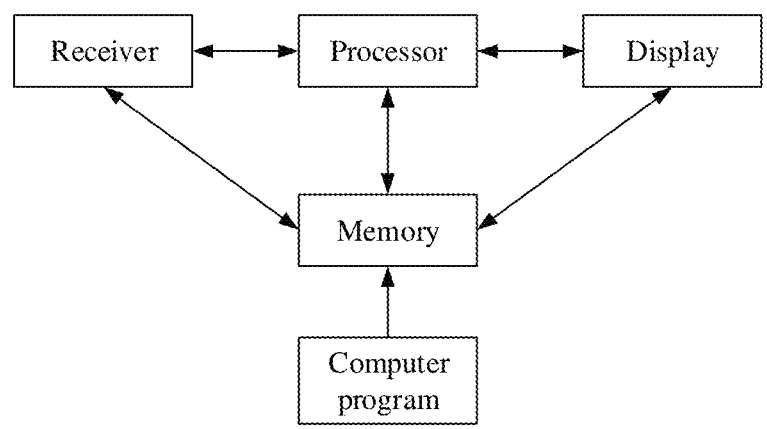
FIG. 10 is a schematic structural diagram of non-limiting, example Embodiment 1 of an electronic device.

FIG. 10 is a schematic structural diagram of non-limiting, example Embodiment 1 of an electronic device. As shown in FIG. 10, the electronic device includes:

a memory, a processor, a receiver, a display, and a computer program stored in the memory, and the processor runs the computer program to perform the method for obtaining ODN logical topology information according to any one of the foregoing method embodiments.

Embodiments of this application further provide a storage medium, including a readable storage medium and a computer program stored in the readable storage medium. The computer program is configured to implement the method for obtaining ODN logical topology information according to any one of the foregoing method embodiments.

Embodiments of this application further provide a computer program product, including: when the computer program product is run on a computer, the computer is enabled to perform the method for obtaining ODN logical topology information according to any one of the foregoing method embodiments.

In the foregoing implementations of the electronic device, it should be understood that the processor may be a central processing unit (CPU), or may be another general purpose processor, a digital signal processor (DSP), an application-specific integrated circuit (ASIC), or the like. The general purpose processor may be a microprocessor, or the processor may be any conventional processor or the like. The steps of the methods disclosed with reference to embodiments of this application may be directly implemented by a hardware processor, or may be implemented by a combination of hardware and a software module in the processor.

All or some of the steps of the foregoing method embodiments may be implemented by using a program by instructing related hardware. The foregoing program may be stored in a readable memory. When the program is executed, the steps of the methods in the embodiments are performed. The memory (storage medium) includes a read-only memory (ROM), a RAM, a flash memory, a hard disk, a solid state disk, a magnetic tape, a floppy disk, an optical disc, and any combination thereof.

What is claimed is:

1. A method for obtaining optical distribution network (ODN) logical topology information, comprising:
    obtaining identification information of each first optical network unit (ONU) that is connected to a first passive optical network (PON) port and whose optical path changes and feature data of the first ONU in a first time window, wherein the feature data indicates data of a feature of a first ONU;
    obtaining, based on the obtained feature data of each first ONU, a feature vector corresponding to the first ONU, wherein the feature vector corresponding to the first ONU indicates a change of the feature data; and
    performing cluster analysis on the obtained feature vector corresponding to each first ONU to obtain topology information corresponding to the first PON port, wherein the topology information comprises identification information of at least one group of first ONUs, and identification information of each group of first ONUs indicating that the first ONUs in the group are connected to a same non-level-1 optical splitter,
    wherein the performing cluster analysis on the feature vector corresponding to each first ONU to obtain topology information corresponding to the first PON port comprises:
    obtaining, based on the feature vector corresponding to each first ONU, a similarity matrix between feature vectors corresponding to any two first ONUs; and
    using all the obtained similarity matrices as input of a cluttering algorithm, to obtain the topology information corresponding to the first PON port.

2. The method according to claim 1, wherein the obtaining of identification information and feature data of each first ONU that is connected to the first PON port and whose optical path changes comprises:
    obtaining identification information and feature data of each ONU connected to the first PON port; and
    filtering out, based on the feature data, any ONU that is connected to the first PON port and whose optical path does not change, to select the identification information and the feature data of each first ONU that is connected to the first PON port and whose optical path changes.

3. The method according to claim 2, wherein the feature data of each first ONU further comprises a distance measuring result.

4. The method according to claim 2, wherein the feature data comprises an alarm event, and the alarm event comprises an alarm generation time and an alarm type, and the filtering out, based on the feature data, any ONU that is connected to the first PON port and whose optical path does not change, to obtain the identification information and the feature data of each first ONU that is connected to the first PON port and whose optical path changes comprises:

comparing a difference between a maximum value and a minimum value of receive optical power of an ONU in the first time window with a preset threshold, and filtering out any ONU whose difference between a maximum value and a minimum value of its receive optical power is less than the threshold, to obtain the identification information and the feature data of each first ONU that is connected to the first PON port and whose optical path changes; and/or filtering out, based on the alarm generation time and the alarm type of each ONU in the first time window, any ONU whose alarm type does not comprise a preset alarm type, to select the identification information and the feature data of each first ONU that is connected to the first PON port and whose optical path changes.

5. The method according to claim 1, wherein the obtaining, based on the feature data of each first ONU, a feature vector corresponding to the first ONU comprises:

for each first ONU, extracting a required feature from the feature data of the first ONU, to form the feature vector corresponding to the first ONU.

6. The method according to claim 1, wherein the feature data comprises receive optical power and the feature of the first ONU indicating the change of the receive optical power in the first time window comprises at least two of a jitter degree, a quantity of jitters, a cliff degree, a trend deterioration degree, a relative location of a time at which a minimum value appears for the first time, a relative location of a time at which a maximum value appears for the first time, a proportion of a length of a longest continuous subsequence in which receive optical power remains to be greater than an average value, or a proportion of a length of a longest continuous subsequence in which receive optical power remains to be less than an average value;

the jitter degree is a standard deviation or an average deviation of data of the receive optical power of the first ONU in the first time window;

the quantity of jitters is an accumulated quantity of times that a jitter degree of the first ONU is greater than a preset threshold;

the cliff degree indicates an attenuation change of the receive optical power of the first ONU from a stable value to another stable value in a unit time; and the trend deterioration degree is indicated by a trend coefficient obtained through linear fitting after an exponential weighted moving average is computed on the receive optical power in the first time window.

7. The method according to claim 1, wherein the first PON port comprises a two-level optical splitting structure, and the method further comprises:

performing matrix conversion on a historical clustering result obtained in each of at least two historical clustering processes corresponding to the first PON port, to obtain a distance matrix corresponding to the historical clustering result, wherein a value in the distance matrix represents a distance between any two first ONUs;

adding the obtained distance matrices corresponding to the historical clustering results obtained in the at least two historical clustering processes corresponding to the first PON port, to obtain a comprehensive distance matrix; and performing, based on the obtained comprehensive distance matrix in a density-based clustering manner, cluster analysis on the first ONU that is connected to the first PON port and whose optical path changes, to update the topology information corresponding to the first PON port.

8. The method according to claim 1, further comprising:

generating a corresponding ODN logical topology diagram based on the obtained topology information corresponding to the first PON port; and generating for display an interface presenting the ODN logical topology diagram.

9. An apparatus for obtaining ODN logical topology information, wherein the apparatus comprises:

a non-transitory memory storing instructions; and at least one processor coupled to the non-transitory memory, wherein the instructions, when executed by the at least one processor, cause the apparatus to:

obtain identification information of each first optical network unit (ONU) that is connected to a first passive optical network (PON) port and whose optical path changes and feature data of the first ONU in a first time window, wherein the feature data indicates data of a feature of a first ONU;

obtain, based on the obtained feature data of each first ONU, a feature vector corresponding to the first ONU, wherein the feature vector corresponding to the first ONU indicates a change of the feature data; and perform cluster analysis on the obtained feature vector corresponding to each first ONU: to obtain topology information corresponding to the first PON port, wherein the topology information comprises identification information of at least one group of first ONUs, and identification information of each group of first ONUs indicates that the first ONUs in the group are connected to a same non-level-1 optical splitter, wherein the performing of cluster analysis on the feature vector corresponding to each first ONU to obtain topology information corresponding to the first PON port comprises:

obtaining, based on the feature vector corresponding to each first ONU, a similarity matrix between feature vectors corresponding to any two first ONUs; and using all the obtained similarity matrices as input of a clustering algorithm, to obtain the topology information corresponding to the first PON port.

10. The apparatus according to claim 9, wherein the instructions, when executed by the at least one processor, further cause the apparatus to:

obtain identification information and feature data of each ONU connected to the first PON port; and filter out, based on the feature data, any ONU that is connected to the first PON port and whose optical path does not change, to select the identification information and the feature data of each first ONU that is connected to the first PON port and whose optical path changes.

11. The apparatus according to claim 10, wherein the feature data of each first ONU further comprises a distance measuring result.

12. The apparatus according to claim 10, wherein the feature data comprises an alarm event, and the alarm event comprises an alarm generation time and an alarm type, and the instructions, when executed by the at least one processor, further cause the apparatus to:

compare a difference between a maximum value and a minimum value of receive optical power of an ONU in the first time window with a preset threshold, and filter out any ONU whose difference between a maximum value and a minimum value of its receive optical power is less than the threshold, to obtain the identification information and the feature data of each first ONU that is connected to the first PON port and whose optical path changes; and/or filter out, based on the alarm generation time and the alarm type of each ONU in the first time window, any ONU whose alarm type does not comprise a preset alarm type, to select the identification information and the feature data of each first ONU that is connected to the first PON port and whose optical path changes.

13. The apparatus according to claim 9, wherein the instructions, when executed by the at least one processor, further cause the apparatus to:

for each first ONU, extract a required feature from the feature data of the first ONU, to form the feature vector corresponding to the first ONU.

14. The apparatus according to claim 9, wherein the feature data comprises receive optical power and the feature of the first ONU indicates the change of the receive optical power in the first time window comprises at least two of a jitter degree, a quantity of jitters, a cliff degree, a trend deterioration degree, a relative location of a time at which a minimum value appears for the first time, a relative location of a time at which a maximum value appears for the first time, a proportion of a length of a longest continuous subsequence in which receive optical power remains to be greater than an average value, or a proportion of a length of a longest continuous subsequence in which receive optical power remains to be less than an average value;

the jitter degree is a standard deviation or an average deviation of data of the receive optical power of the first ONU in the first time window;

the quantity of jitters is an accumulated quantity of times that a jitter degree of the first ONU is greater than a preset threshold;

the cliff degree indicates an attenuation change of the receive optical power of the first ONU from a stable value to another stable value in a unit time; and the trend deterioration degree is indicated by a trend coefficient obtained through linear fitting after an exponential weighted moving average is computed on the receive optical power in the first time window.

15. The apparatus according to claim 9, wherein the instructions, when executed by the at least one processor, further cause the apparatus to:

when the first PON port comprises a two-level optical splitting structure, perform matrix conversion on a historical clustering result obtained in each of at least two historical clustering processes corresponding to the first PON port, to obtain a distance matrix corresponding to the historical clustering result, wherein a value in the distance matrix represents a distance between any two first ONUs, add the obtained distance matrices corresponding to the historical clustering results obtained in the at least two historical clustering processes corresponding to the first PON port, to obtain a comprehensive distance matrix, and perform, based on the obtained comprehensive distance matrix in a density-based clustering manner, cluster analysis on the first ONU that is connected to the first PON port and whose optical path changes, to update the topology information corresponding to the first PON port.

16. The apparatus according to claim 15, wherein the instructions, when executed by the at least one processor, further cause the apparatus to:

prior to performing the cluster analysis, correct the obtained comprehensive distance matrix by determining whether a value of each element in the obtained comprehensive distance matrix is less than a threshold value and, upon determination that the value of the element is less than the threshold value, setting the value of the element to 0.

17. The apparatus according to claim 9, wherein the instructions, when executed by the at least one processor, further cause the apparatus to:

generate a corresponding ODN logical topology diagram based on the topology information corresponding to the first PON port; and the apparatus further comprises a display configured to display the ODN logical topology diagram.

18. A non-transitory computer readable storage medium storing a computer program that when executed by a computer, cause the computer to perform functions comprising:

obtaining identification information of each first optical network unit (ONU) that is connected to a first passive optical network (PON) port and whose optical path changes and feature data of the first ONU in a first time window, wherein the feature data indicates data of a feature of a first ONU;

obtaining, based on the obtained feature data of each first ONU, a feature vector corresponding to the first ONU, wherein the feature vector corresponding to the first ONU indicates a change of the feature data; and performing cluster analysis on the obtained feature vector corresponding to each first ONU to obtain topology information corresponding to the first PON port, wherein the topology information comprises identification information of at least one group of first ONUs, and identification information of each group of first ONUs indicates that the first ONUs in the group are connected to a same non-level-1 optical splitter, wherein the performing of cluster analysis on the feature vector corresponding to each first ONU to obtain topology information corresponding to the first PON port comprises:

obtaining, based on the feature vector corresponding to each first ONU, a similarity matrix between feature vectors corresponding to any two first ONUs; and using all the obtained similarity matrices as input of a clustering algorithm, to obtain the topology information corresponding to the first PON port.

* * * * *

UNITED STATES PATENT AND TRADEMARK OFFICE
CERTIFICATE OF CORRECTION

PATENT NO. : 11,722,217 B2
APPLICATION NO. : 17/859029
DATED : August 8, 2023
INVENTOR(S) : Yuming Xie It is certified that error appears in the above-identified patent and that said Letters Patent is hereby corrected as shown below:

In the Specification

Column 10, Line 21, change "$RxPower_{min} - RxPower_{min} \geq RxPower_{th}$." to "$RxPower_{max} - RxPower_{min} \geq RxPower_{th}$"; and Column 18, Line 40, change "If there is an object q" to "If there is an object o".

Signed and Sealed this
Fifth Day of September, 2023

Katherine Kelly Vidal
*Director of the United States Patent and Trademark Office*